United States Patent [19]

Venkateswar et al.

[11] Patent Number: 5,630,027

[45] Date of Patent: May 13, 1997

[54] METHOD AND APPARATUS FOR COMPENSATING HORIZONTAL AND VERTICAL ALIGNMENT ERRORS IN DISPLAY SYSTEMS

[75] Inventors: Vadlamannati Venkateswar, Plano, Tex.; Vivek K. Thakur, Bangalore, India

[73] Assignee: Texas Instruments Incorporated, Dallas, Tex.

[21] Appl. No.: 364,916

[22] Filed: Dec. 28, 1994

[51] Int. Cl.$^6$ .................................................. B41B 15/00
[52] U.S. Cl. .............................................. 395/108; 395/101
[58] Field of Search .................................... 395/100, 101, 395/108, 107, 128, 117, 109; 347/240; 359/54, 259; 358/450, 458, 474, 505; 382/284, 318; 345/5, 55

[56] References Cited

U.S. PATENT DOCUMENTS

| | | | |
|---|---|---|---|
| 4,700,149 | 10/1987 | Roe et al. | 359/259 |
| 4,888,724 | 12/1989 | Marom et al. | 364/807 |
| 5,040,876 | 8/1991 | Patel et al. | 359/54 |
| 5,317,445 | 5/1994 | DeJule et al. | 359/250 |
| 5,339,090 | 8/1994 | Crossland et al. | 345/90 |
| 5,461,410 | 10/1995 | Venkateswar et al. | 347/240 |
| 5,461,411 | 10/1995 | Florence et al. | 347/240 |

*Primary Examiner*—Edward L. Coles, Sr.
*Assistant Examiner*—Gabriel I. Garcia
*Attorney, Agent, or Firm*—Charles A. Brill; James C. Kesterson; Richard L. Donaldson

[57] ABSTRACT

The present invention provides a method of ameliorating the effects of misalignment between modulator arrays, and a system using the same. The ability reduce the effects of misalignment allows multiple, smaller, more cost effective arrays to be used instead of one large array. This can reduce the manufacturing costs of the array, especially arrays that are produced using semiconductor manufacturing processes such as the digital micromirror device. To avoid visual artifacts caused by the misalignment of two or more modulator arrays 1702, 1704, the individual arrays 1702, 1704 are optically overlapped and a portion of the image 1706 is generated by both arrays 1702, 1704. A breakpoint is chosen between two pixels in the overlapped region 1706 at which to abut the images from each of the modulator arrays 1702, 1704. The breakpoint is changed each row of pixels to minimize the detectability of any visual artifact caused by misalignment between the modulator arrays 1702, 1704.

17 Claims, 12 Drawing Sheets

METHOD AND APPARATUS FOR COMPENSATING HORIZONTAL AND VERTICAL ALIGNMENT ERRORS IN DISPLAY SYSTEMS

TECHNICAL FIELD OF THE INVENTION

This invention relates to the alignment of image display devices and more particularly to the amelioration of artifacts caused by the misalignment of spatial light modulators used in printing and display systems.

BACKGROUND OF THE INVENTION

Many types of modulators are used to print or display text and images. The desired characteristics of modulators typically include high resolution, high display speed, and freedom from image distortion. Modulators typically include an array of modulator elements which operate in concert to produce an image. Each operation cycle of the modulator is called a modulator cycle. Each image is typically represented as a two-dimensional array of picture elements, or pixels, called a pixel grid. Each pixel represents the smallest independent picture element that may be produced by a modulator. Each pixel may be produced by a single modulator cycle, for example a single LED element that outputs a pulse of variable intensity light to illuminate a pixel, or the pixel may be produced by multiple modulator cycles, for example an LED element that outputs a series of light pulses which act in cooperation to illuminate a pixel. Although each pixel is typically related to a single modulator element, some systems use the output from multiple modulator elements to display one pixel. A modulator element may be an individual LED, an LCD cell, an ink-jet, a digital micromirror device (DMD), a thermal printer head, or an electron gun, or any other device capable of producing an image.

Complete images may be produced in three ways. Sequential scanning, as employed in CRTs and laser printers, requires only one modulator element which sequentially scans the image pixels in a line, one line at a time until the entire image has been scanned. A second method, used by line printers and some image displays, requires at least one modulator element for each image pixel in a line. The modulator elements display all of the pixels in a line simultaneously and sequentially display each line of the image. The third method, used by frame-addressed spatial light modulators (SLMs), uses an array of pixels simultaneously to display an entire image "frame." Frame addressed modulators require a modulator with at least as many elements as the number of image pixels.

High resolution printers require a large number of image pixels to be printed on each line. For example, an electrostatic printer capable of printing 300 pixels or dots per inch (DPI), must print 2550 pixels across one line on 8.5 inch paper. If the image is printed a line at a time, the modulator used in the printer must have at least 2550 elements. As the number of modulator elements increases, so does the complexity and size of the modulator required to generate the image.

The torsion beam digital micromirror device (DMD) SLM, as taught in commonly assigned U.S. Pat. No. 5,061, 049, may be used to modulate light in an electrostatic printer. DMDs are manufactured using semiconductor processing techniques and may be fabricated with one million or more modulator elements on a single DMD. However, a DMD with 2550 mirrors in a single row is a large device by semiconductor standards and presents many fabrication challenges. If each pixel of the DMD is 34 µm wide, a row of 2550 pixels is about 3.4 inches long and the die for each device may be approximately 3.5 inches long. This large die size can result in a low wafer utilization. For example, if the 3.5 inch long DMD in the above example is 0.25 inches wide, only 42 DMDs could be manufactured from an eight inch diameter wafer. This would result in a wafer utilization of approximately 73%.

Furthermore, the yield of good DMDs will be low because the large number of mechanical and electrical structures fabricated on each DMD increases the probability of there being at least one defective structure on the DMD. This is partially due to the fact that for a given surface contamination rate, an increase in size of each DMD will increase the probability of a surface contaminant being located on the device. For example, if the probability of a defect in a given structure is 1%, then the probability of producing a defect-free device that includes ten of the structures is about 90%, while the probability of producing a defect-free device that includes 1000 of the structures is about 0.0043%. Because the same process steps, and approximately the same amount of raw materials are used regardless of the number of DMDs formed on a wafer, the cost of processing a wafer is practically independent of the number of DMDs formed on the wafer. Therefore, the low yield and low wafer utilization that occur when large DMDs are manufactured result in a dramatic increase in the cost of good DMDs.

In order to reduce the cost and complexity of the modulators used in image displays, several discrete modulators have been used, each displaying only a portion of the entire image. For example, four DMDs, each with 2,400 elements, are used in place of the 9,600 element DMD in the above example. While this reduces the size of each DMD to about 1.6 inches, and increases both the wafer utilization and device yield, using multiple modulators introduces the possibility of misaligned modulators. If the modulators are not correctly aligned, the resultant image may be distorted, appearing to have features that are not part of the desired image. For example, areas of the image may appear brighter or darker than desired. These image defects are called "artifacts" because they represent an artificial feature caused by the method of image creation instead of a true feature of the desired image.

The effect of artifacts caused by misalignment is increased where one row of modulator elements sequentially produces image pixels line-by-line. This is because misalignment-caused artifacts are duplicated on each line, creating a strong vertical or horizontal feature which is easily perceived by the human eye. Precisely aligning multiple modulators during assembly of the modulator eliminates alignment artifacts but typically requires the use of precision machined surfaces acting as positional references or complex alignment routines. These methods can be expensive to implement and may result in an unacceptably high rework or rejection rate. Thus, there is a need for a system and method of operation that are capable of tolerating some misalignment without the image being deleteriously affected by artifacts.

SUMMARY OF THE INVENTION

The present invention provides a method of ameliorating the effects of misalignment between modulator arrays, and a system using the same. The ability to reduce the effects of misalignment allows multiple, smaller, more cost effective arrays to be used instead of one large array. This can reduce the manufacturing costs of the array, especially arrays that are produced using semiconductor manufacturing processes such as the digital micromirror device.

One embodiment of a method of ameliorating the effects of misalignment between two or more modulators each capable of generating an output over a region, according to the present invention, comprises overlapping a portion of the output region from each modulator with a portion of the output region of at least one other modulator and alternating the task of forming the pixels within the overlapped region between the two modulators. A portion of the pixels in the overlapped region are typically formed by each modulator and the breakpoint, or the point at which a first modulator ceases forming the pixels and a second modulator begins, is changed each row, thereby minimizing the detectability of any visual artifact created by the misalignment.

Another embodiment, according to the present invention, of a system of ameliorating the effects of misalignment between pixel images generated by an array of modulator elements, involves using an optical system to optically overlap separate rows of a single modulator array. Because the overlapping portions of the modulator arrays collectively form a portion of the image, any alignment error is effectively spread over the entire overlapping portion and is much less noticeable.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

As noted earlier, one disadvantage of prior art techniques which involve using more than one modulator to produce a row of pixels is the need to precisely align the modulators relative to each other. Because predominately vertical and horizontal features are easily detected by the human eye, a small misalignment between modulators may result in a very noticeable visual artifact. The present invention uses multiple modulators to produce an image wherein each modulator produces a portion of the image. These portions of the image are overlapped so that at least two modulators contribute to the overlapped portion of the image. This allows any misalignment error to be distributed over the overlapped portion of the displayed image, thereby making the error less noticeable to the viewer.

The present invention is applicable to a wide variety of systems and image display technologies. Any system that creates an image by using two or more modulators, each of which forms a portion of the image, may use certain embodiments of this invention. The image formed could be either a binary image, one in which there are only two possible pixel intensities, or gray-scale image having multiple pixel intensities. It is not important whether the image is ephemeral, as in a video display, or permanent, as in printed page. The first embodiment of the present invention discussed is a page printer. The page printer is described as implementing a xerographic or electrostatic print process, but other processes such as thermal, impact, ink-jet, or photographic print processes may be used.

Figure 1:
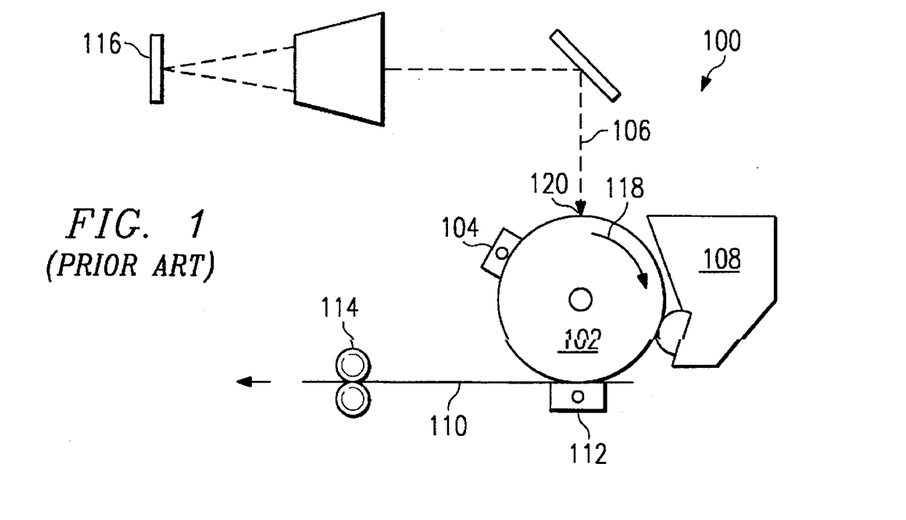
FIG. 1 is a schematic representation of a prior art electrostatic printer.

An electrostatic printer 100, shown schematically in FIG. 1, typically includes a rotating photosensitive drum 102, the surface of which is charged by a main corona unit 104 as the surface of the drum 102 moves past the corona unit 104. The surface of photosensitive drum 102 is made from a material which is normally an electrical insulator but becomes electrically conductive when exposed to light. In the absence of light, the surface of the drum 102 is electrically insulative, causing the charge from the main corona unit 104 to be held on the insulative surface of the drum 102 and preventing the charge from moving about on the insulative surface of the drum 102. To create a latent image, portions of the drum 102 are selectively exposed to light 106 causing those portions to become electrically conductive, thereby allowing the charge on such portions to drain from the exposed surface to the body of the drum 102. The quantity of charge allowed to drain from the exposed portions, and therefore the remaining charge, depends on the intensity and duration of the exposure. Portions of the drum 102 which are not exposed to light but are adjacent to the exposed regions are not affected by the exposure and maintain their charge.

Typically the photosensitive surface of the drum 102 is exposed one line at a time as the surface passes an image point 120 at which point the light 106 is selectively incident on the drum 102. The exposed drum surface then rotates past a toner supply 108 from which small particles of toner, or ink, are electrostatically attracted to the portions of the drum 102 that are still charged. The amount of toner attracted to a given portion of the drum 102 depends on the magnitude of the charge remaining on that portion of the drum 102. The toner attracted to the drum 102 develops the latent image on the drum 102 produced by the exposure to light, and is carried from the toner supply 108 on the surface of the drum 102. When the toner on the surface of the rotating drum 102 reaches a transfer corona unit 112, it is electrostatically transferred to a sheet of paper 110 and carried on the paper 110 to a fuser 114 which melts the toner, causing it to fuse to the paper 110 thereby forming a permanent image on the paper 110. The greater the remaining charge on a portion of the drum 102, the more toner adheres to that portion of the drum 102 and the darker the image formed on the paper 110 by the fused toner.

Because the drum 102 is being rotated past the image point 120 where the light 106 is incident on the drum 102, a modulator 116 having one row of elements (not shown) may expose an entire image one line at a time. There are several reasons for exposing the drum 102 one line at a time. These reasons include the following: the entire image would be difficult to simultaneously bring into focus on the curved surface of the drum 102; the modulator 116 used to create a complete image would require many more elements than a modulator 116 used to image only one line; a smaller light source may be used with a line-at-a-time modulator; and imaging only one line at a time permits the drum 102 to have a relatively small diameter, which, in turn permits the main corona unit 104 and toner supply 108 to be closer together, reducing the size of the printer 100.

Although the output of the printer 100 is a printed piece of paper, the modulator 116 is used to cream a latent image on the printer drum 102. Furthermore, because the light 106 is used to selectively discharge portions of the drum 102 where toner is not desired, the image used to expose the drum 102 is the negative of the image printed on the paper 110. Because this embodiment of the invention deals with the alignment of the modulator 116 used to image the printer drum 102, the paper 110 output will not be discussed further, and the image projected onto the drum 102 will be referred to as the display.

Two terms are commonly used to denote directional relationships in an electrostatic printer 100. The first term, "process direction," is used to describe the direction 118 of the drum 102 rotation. As the drum 102 rotates in the process direction 118, each portion of the drum 102 passes beneath the main corona unit 104, the image point 120, the toner supply 108, and the transfer corona unit 112. The second term, scan "direction," defines a direction which is perpendicular to the process direction across the surface of the drum, or perpendicular to the plane of FIG. 1. The term scan direction is derived from applications such as laser printers that sweep, or scan, a beam of light across a line of pixels as the drum 102 is rotating.

Figure 2:
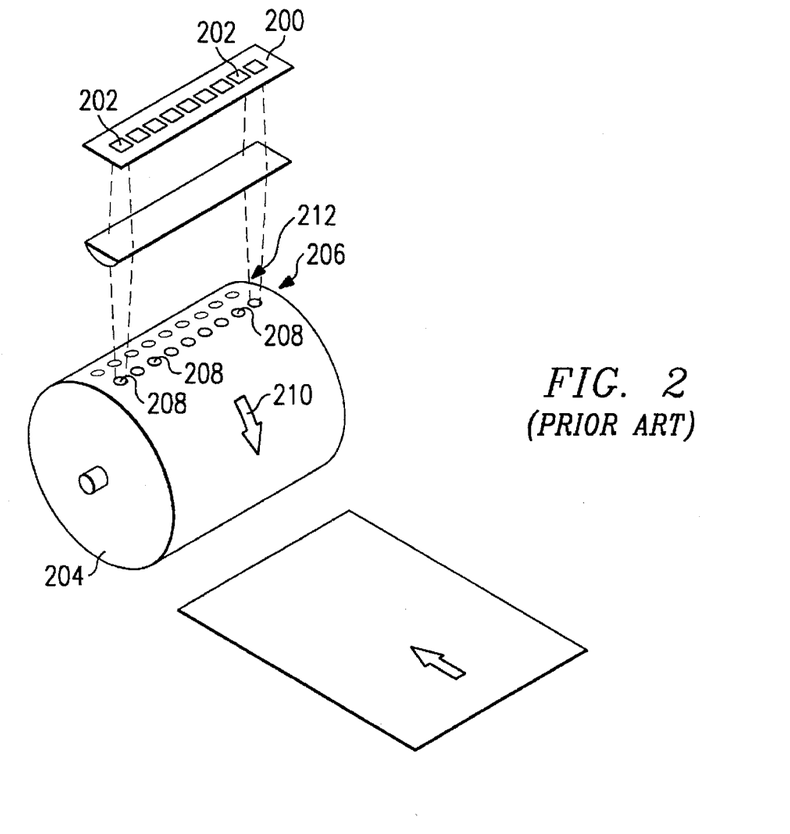
FIG. 2 is a pictorial view of a prior art modulator army illuminating an electrostatic printer drum.

There are several types of light sources which may be used to expose the drum 102. Because the intensity of the light 106 impinging on the drum 102 must be modulated to create an image, it is desirable to use a variable light source when the source is used to image one pixel at a time. Some light sources such as lasers and light emitting diodes (LEDs) are capable of rapidly varying the output light beam intensity, thereby eliminating the need for a separate modulator. Other light sources including arc and filament lamps cannot be modulated easily and therefore require a separate light modulator. In a simple example, shown pictorially in FIG. 2, a linear array 200 of LED elements 202 serves as both a light source and a light modulator to selectively expose a drum 204. The light from each LED 202 in the linear array 200 is focused onto one pixel 208 on the drum. Thus, the LED array 200 simultaneously exposes one row of pixels 206 on the drum 204. The intensity of each LED 202 is adjusted to control the exposure level of each pixel 208. After exposing one row of pixels on the drum, the LED array 200 is turned off while the drum 204 is rotated in the process direction 210. After the drum 204 has rotated a distance equal to the spacing between rows of pixels, a subsequent row of pixels 212 is exposed. This process continues row-by-row until the drum 204 has been exposed to light representing every row of the data.

Figure 3:
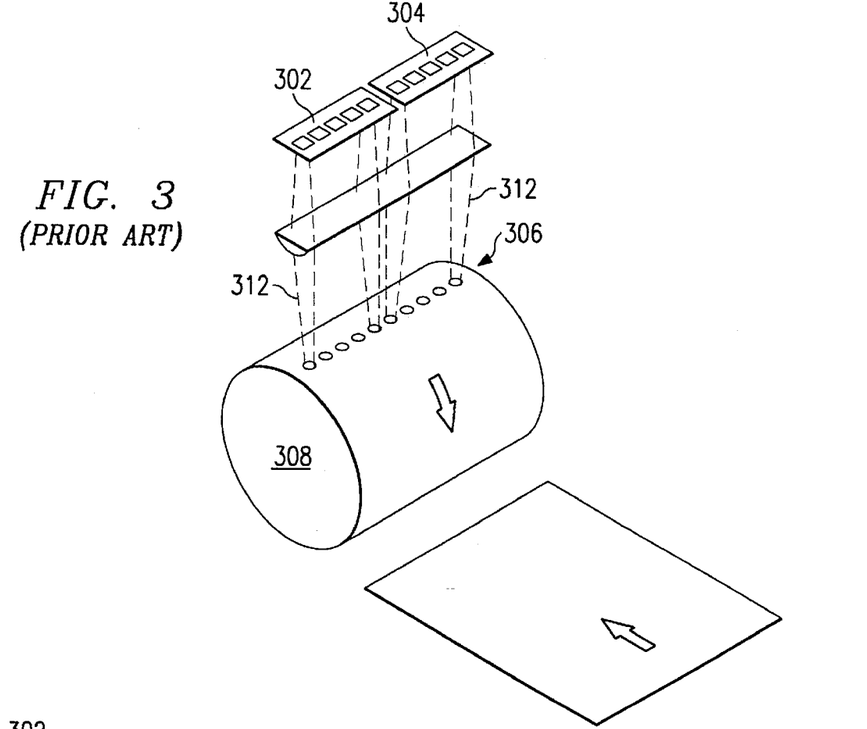
FIG. 3 is a pictorial view of two prior art modulator arrays illuminating a single scan row of an electrostatic printer drum.

As discussed earlier, it is sometimes impractical to build a single modulator array 200 that is large enough to expose an entire row of pixels 206. As shown in FIG. 3, two or more smaller arrays 302, 304 may be used in place of the single large army 200 of FIG. 2. If two arrays 302, 304 are used, part of an image is printed by one array 302, and a second part of the image is printed by a second array 304. As discussed earlier, the output image is comprised of a two-dimensional array of pixels, or a pixel grid. Each pixel in a row of the pixel grid is evenly spaced from each adjacent pixel in the row. Likewise, each row of pixels is evenly spaced from adjacent rows of pixels. The actual spacing depends on the pixel size, the resolution of the display, and the desired fill factor of the output image.

Figure 4:
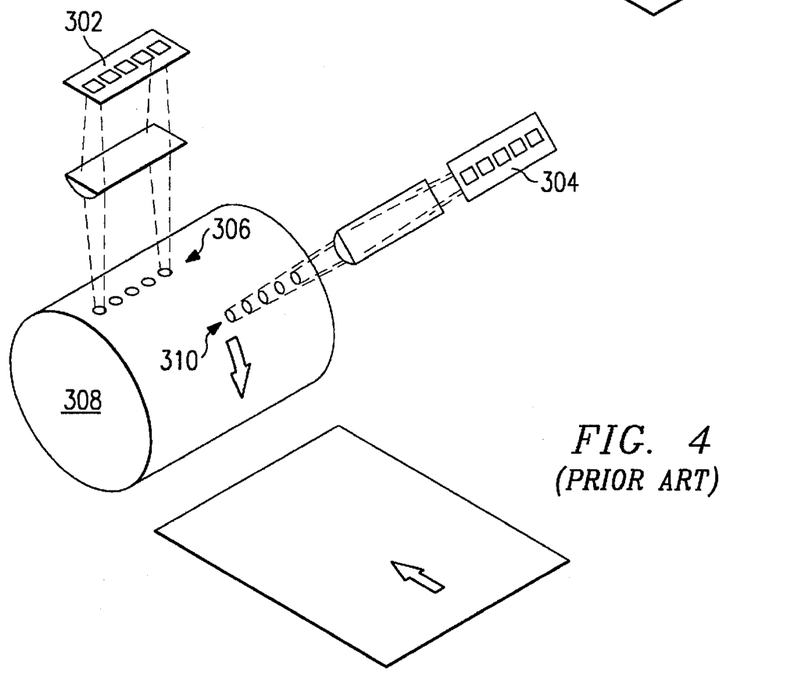
FIG. 4 is a pictorial view of two prior art modulator arrays illuminating portions of two scan rows of an electrostatic printer drum.

The two modulator arrays 302, 304 may be positioned, as shown in FIG. 3, such that they both image the same scan line 306, or the second array 304 may be separated, or offset, in the process direction from the first array 302 as shown in FIG. 4. If the two arrays 302, 304 are offset in the process direction, optics are used to either direct the output from both arrays 302, 304 onto the same scan line 306 on the drum 308, or onto a second scan line 310. If the two arrays 302, 304 image different scan lines, the image data applied to the second modulator 304 is delayed relative to the dam applied to the first modulator 302 by the time required to rotate the drum 308 from the first scan line 306 to the second scan line 310. The delay ensures that the output of the two modulators 302, 304 will expose the same row of image pixels. Regardless of any offset in the process direction between the two modulator arrays 302, 304, the output from the two arrays 302, 304 is abutted on a single scan line.

Any misalignment of the two modulators 302, 304 in either the scan or process directions will alter the uniform spacing of the pixel grid and result in a "seam" in the process direction at a point of transition between the output of a first modulator 302 and the output of a second modulator 304. Because the human eye tends to easily detect vertical or horizontal artifacts, the seam in the process direction, which may end up being either vertical or horizontal on the final output, but for the purposes of this discussion will be assumed to be horizontal, may be very noticeable, especially in text and graphic information where high contrast fonts or fine information is being reproduced.

Figure 5:
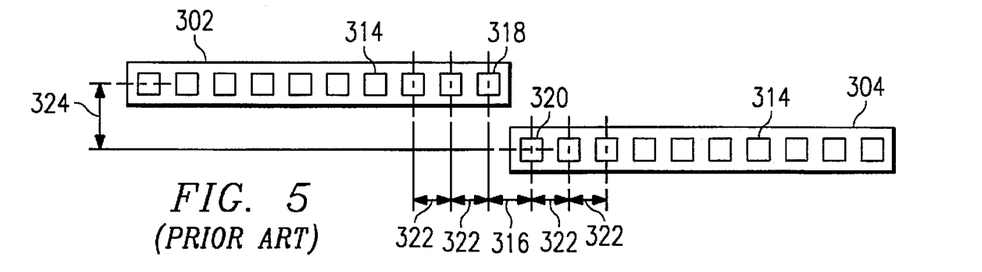
FIG. 5 is a plan view of two prior art modulator arrays, as shown in FIGS. 3 and 4, showing misalignment in a scan direction.

FIG. 5 shows two modulator arrays 302, 304, each having ten elements 314. The two modulator arrays 302, 304 are misaligned causing the distance 316, in the scan direction, between the right-most element 318 of the first modulator array 302 and the left-most element 320 of the second modulator array 304 to be only 80% of the unit spacing 322 between all other elements 314 in the row. Although not shown in FIG. 5, the two modulator arrays 302, 304 could also be misaligned in the process direction. That is, the spacing 324, in the process direction, between the output of the two modulator arrays 302, 304 is not equal to the data delay between the two modulators 302,304.

Figure 6:
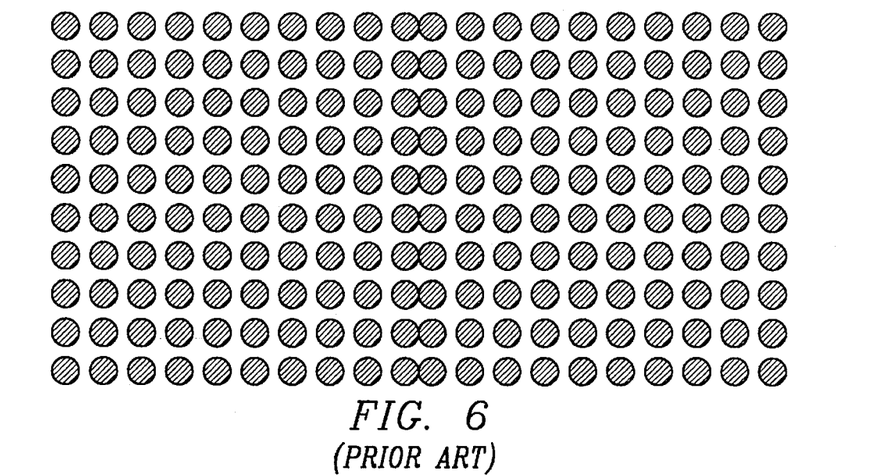
FIG. 6 is a view of an array of pixels produced by the misaligned modulator arrays of FIG. 5.

FIG. 6 shows an army of pixels 600 printed by the misaligned modulator arrays 302, 304 of FIG. 5. In FIG. 6, the spacing between the tenth pixel 602 and the eleventh pixel 604 in each row is only 80% of the spacing between each other pair of adjacent pixels. This causes a vertical artifact to appear in the text in the area 606 between the tenth 602 and eleventh 604 pixels. While this artifact may not be too objectionable when a single line of text is printed, when many lines of text are printed on a single page the lines tend to reinforce the artifact making it more noticeable. In addition to simply causing the pixels to be too close, inadequate spacing in electrostatic printers causes an increase in toner use as the toner tends to "clump up" between two closely spaced pixels. The additional toner may cause the two pixels to blend into one large pixel and further exacerbate the artifact caused by misalignment. The opposite effect occurs when the two modulator arrays 302, 304 are spaced too far apart. Misalignment in the process direction (not shown) has a similar effect. Furthermore, misalignment in the process direction 608 causes distortion in lines that are parallel to the scan direction 610.

Figure 7:
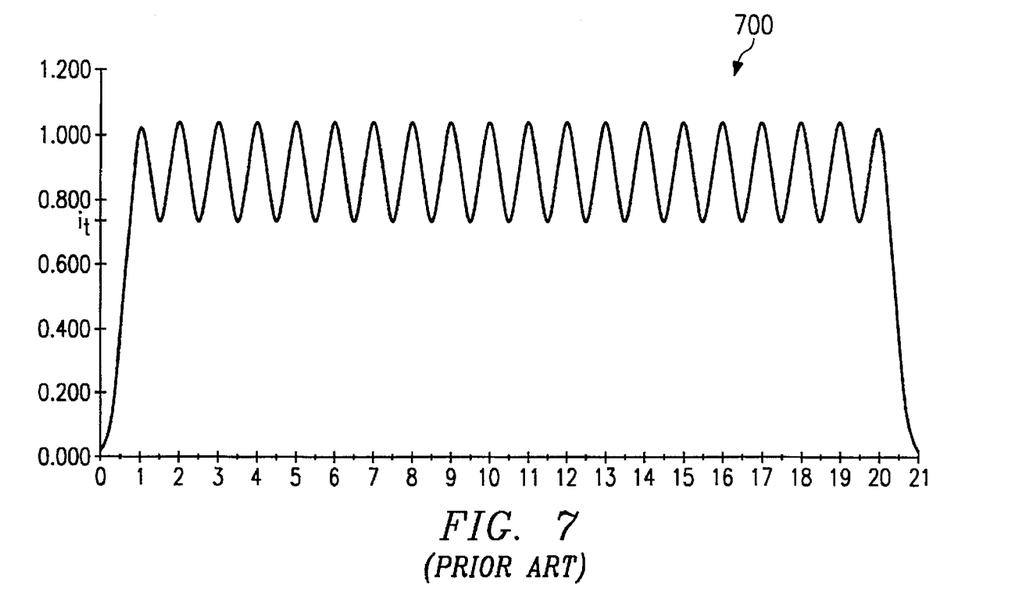
FIG. 7 is a plot of the intensity distribution of light projected onto an electrostatic printer drum across a single scan row by the modulator arrays of FIGS. 2, 3, or 4.

Referring back to FIG. 3, as light 312 is imaged onto the drum, the intensity of the light from each modulator element 314 typically has a Gaussian distribution pattern. The intensity distribution 700 for a row of twenty pixels is shown in FIG. 7. FIG. 7 plots the position of each pixel in the scan direction on the horizontal axis and the light intensity on the vertical axis. FIG. 7 is the ideal or desired intensity distribution output for a twenty-element segment of either a single light modulator or multiple abutted light modulators 302, 304. It is important to note that the intensity distribution shown in FIG. 7 is a cross-section along a row of pixels in the scan direction. The actual light distribution from each pixel is Gaussian in both the process and scan directions resulting in light with a cone shaped intensity distribution being projected onto the drum 308 by each modulator element 314.

Figure 8:
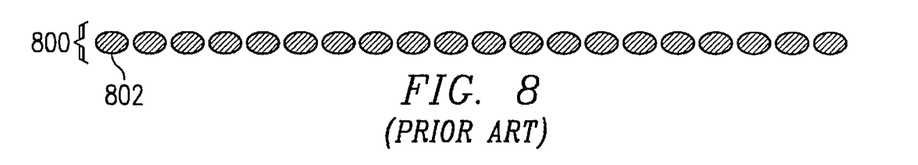
FIG. 8 is a view of a single row of dots printed by the exposure shown in FIG. 3.

FIG. 8 shows a row 800 of dots 802 that would be imaged on the drum 308 by light having the distribution shown in FIG. 7. The dots shown in FIG. 8 represent the areas of the photosensitive drum that are discharged by exposure to light. As discussed above, the discharged areas do not attract toner and therefore do not result in a dot being printed on the paper output of the printer. However, to illustrate the utility of the disclosed invention, the exposed dots will be shown as a shaded area and the unexposed regions surrounding the dots will be left blank. In FIG. 8, the photosensitive drum 308 is assumed to have a very abrupt transition, or intensity threshold, from electrically insulative to electrically conductive. All areas with an exposure greater than the intensity threshold, shown as it in FIG. 7, are shown as a dark area and areas with an exposure of less than $i_t$ are shown as light areas. Although the dots 802 are shown in FIG. 8 as having a uniform intensity, the transition of the photosensitive drum 308 from electrically insulative to electrically conductive is typically more gradual such that the centers of the dots 802 are typically darker than the edges. Some light from each modulator element 314 reaches the regions surrounding the imaged pixel and partially exposes the region occupied by adjacent dots 802. This reinforcement effect causes the dots 802 printed on the interior of a single row 800 to appear elliptical in contrast with dots 802 at each end of row 800 which appear egg-shaped. A single dot will appear circular if it is located too far away from any other dots to receive reinforcement.

Figure 9:
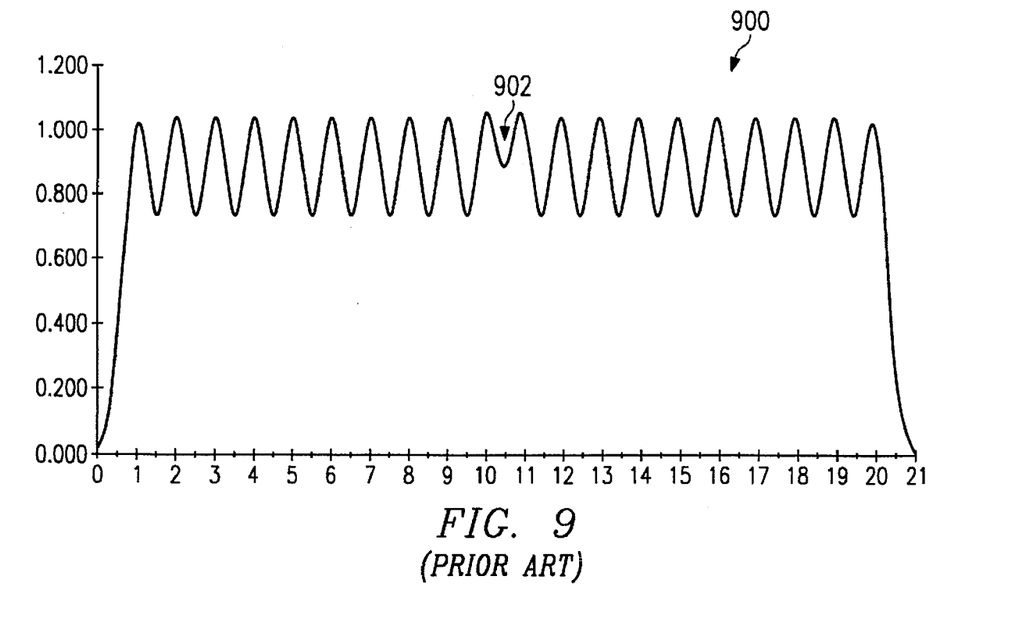
FIG. 9 is a plot of the intensity distribution of light projected onto an electrostatic printer drum across a single scan row by the two abutted ten-element modulator arrays of FIGS. 3 and 4 that are spaced apart 10% less than the ideal spacing.
Figure 10:
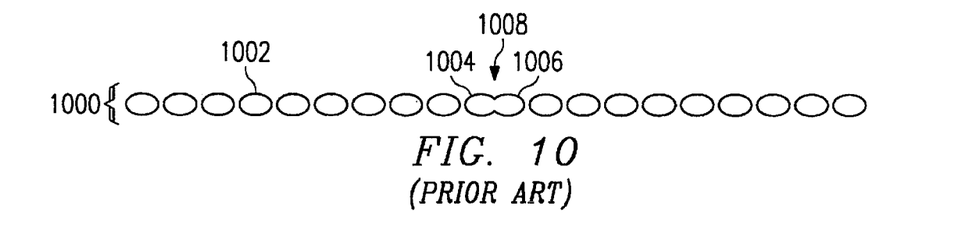
FIG. 10 is a view of a single row of dots printed by the exposure shown in FIG. 9.

FIG. 9 shows the intensity distribution 900 for light from two ten-element abutted arrays 302, 304 that are misaligned in the scan direction. In this case, the spacing between the tenth and eleventh pixels in the row is 10% less than the spacing between other adjacent pixels. The area between the middle two pixels 902 is reduced and receives more fight from the adjacent arrays. FIG. 10 shows the line 1000 of dots 1002 that would be printed by the exposure of FIG. 9. As can be seen, the dots 1004, 1006 printed on either side of the seam 1008 between the two modulator arrays 302, 304 are larger than the other dots and blend together to form one dot. If the two modulator arrays 302, 304 had been too far apart, there would have been an abnormally large gap between the middle two dots 1004, 1006 and the middle two dots 1004, 1006 would have been smaller due to a reduction in the reinforcement from adjacent elements on the abutted modulator array.

Figure 11:
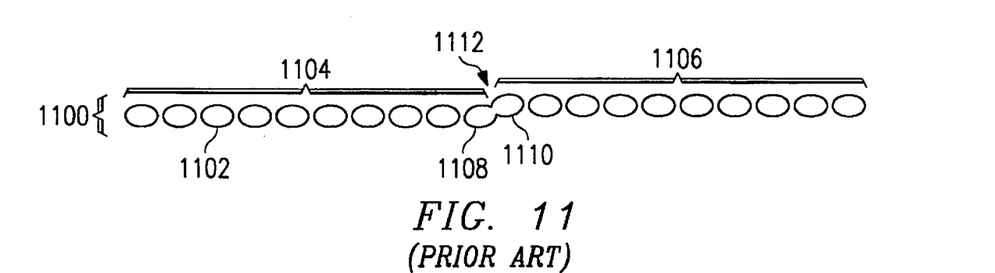
FIG. 11 is a view of a single row of dots printed by the two ten-element abutted arrays of FIGS. 3 and 4 that are misaligned in both a process and a scan direction.

Although intensity distribution 900 only included misalignment in the scan direction, the same effect occurs when the two arrays are misaligned in the process direction. FIG. 11 shows a row 1100 of dots 1102 that have been printed by two abutted arrays 302, 304 that are misaligned in both the scan and process directions. Any misalignment in the process direction not only results in the two halves 1104, 1106 of the row 1000 being misaligned, but also reduces the size of the dots 1108, 1110 nearest the seam 1112 because of the reduction of reinforcement between the elements 314 of the modulator arrays 302, 304.

Figure 12:
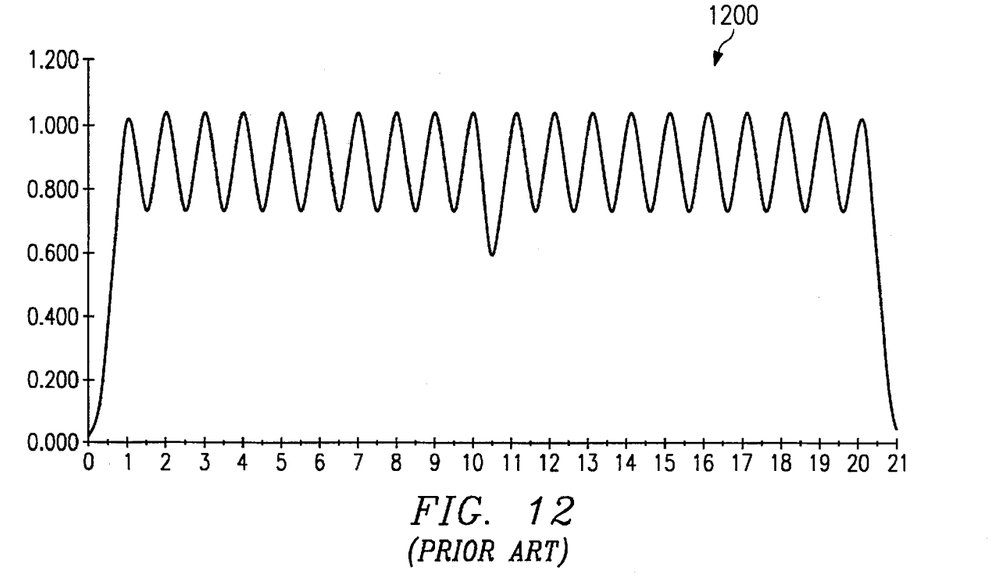
FIG. 12 is a plot of the intensity distribution of light projected onto an electrostatic printer drum across a single scan row by the two abutted ten-element modulator arrays of FIGS. 3 and 4 that are spaced apart 10% more than the ideal spacing.
Figure 13:
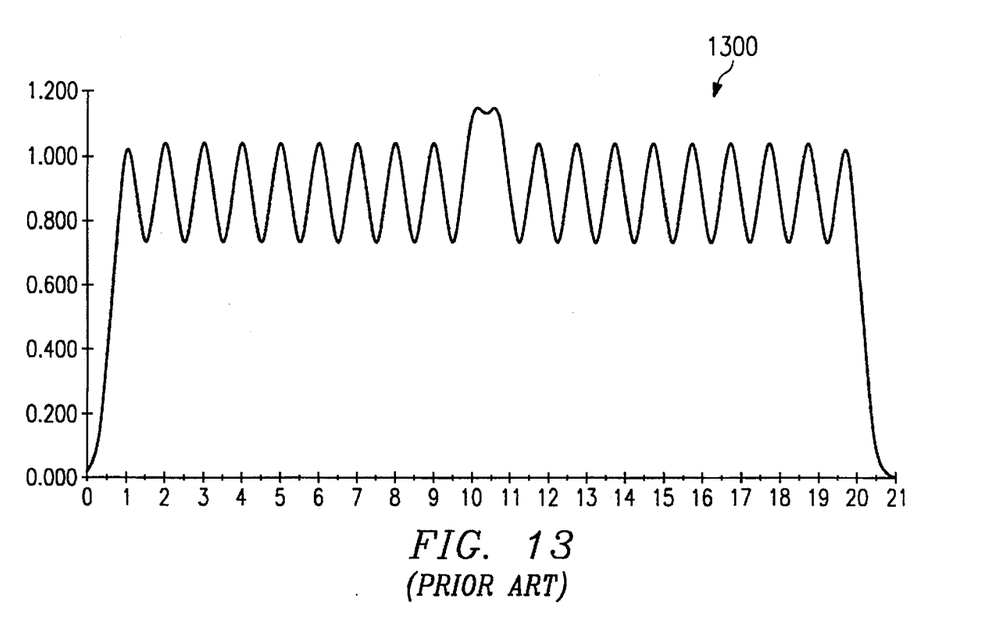
FIG. 13 is a plot of the intensity distribution of light projected onto an electrostatic printer drum across a single scan row by the two abutted ten-element modulator arrays of FIGS. 3 and 4 that are spaced apart 25% less than the ideal spacing.
Figure 14:
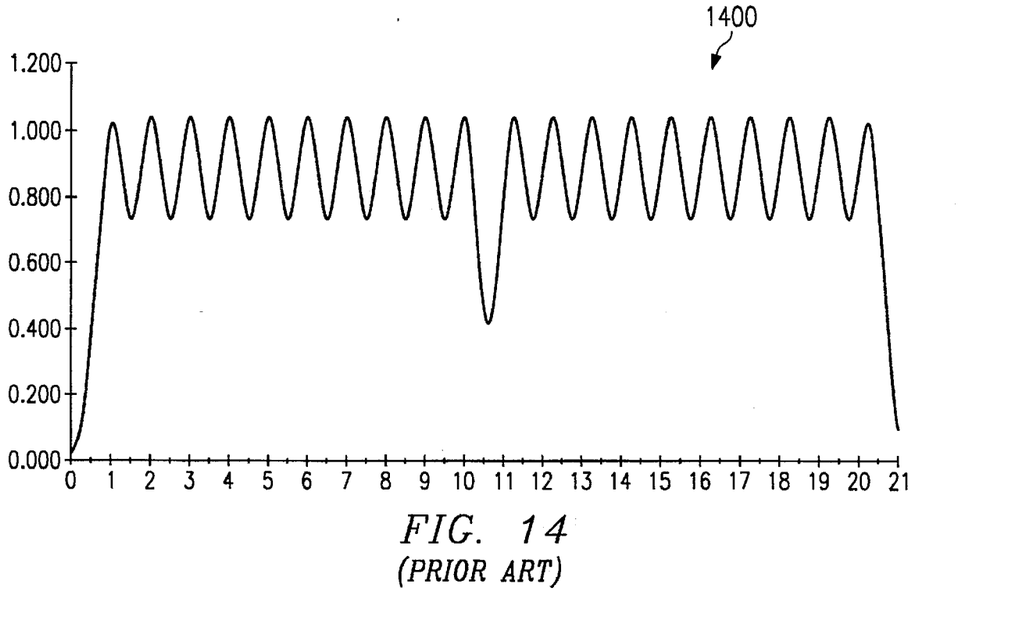
FIG. 14 is a plot of the intensity distribution of light projected onto an electrostatic printer drum across a single scan row by the two abutted ten-element modulator arrays of FIGS. 3 and 4 that are spaced apart 25% more than the ideal spacing.
Figure 15:
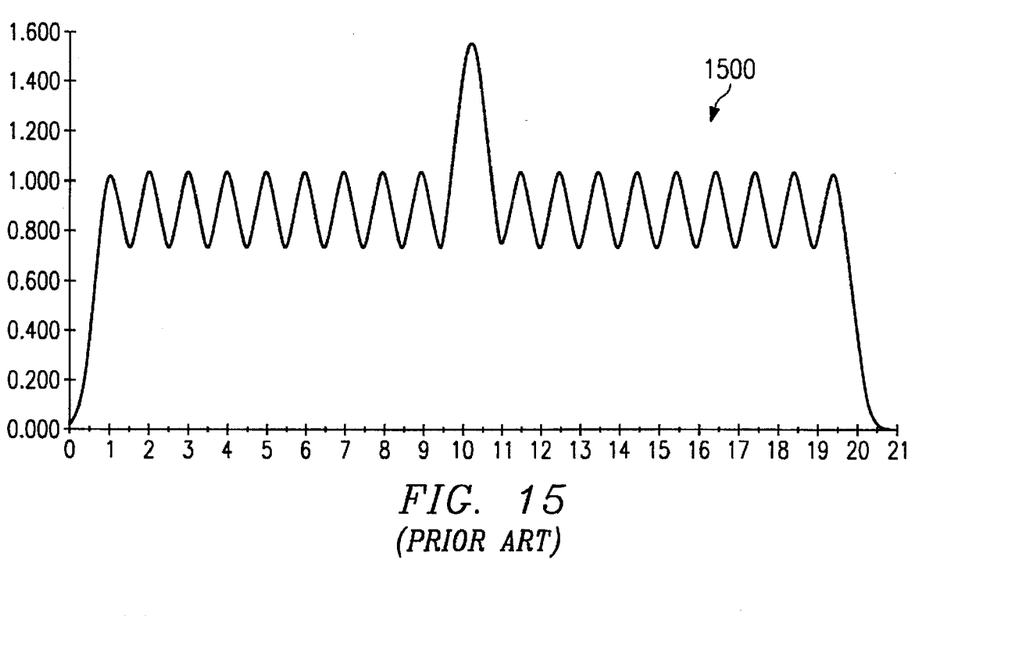
FIG. 15 is a plot of the intensity distribution of light projected onto an electrostatic printer drum across a single scan row by the two abutted ten-element modulator arrays of FIGS. 3 and 4 that are spaced apart 50% less than the ideal spacing.
Figure 16:
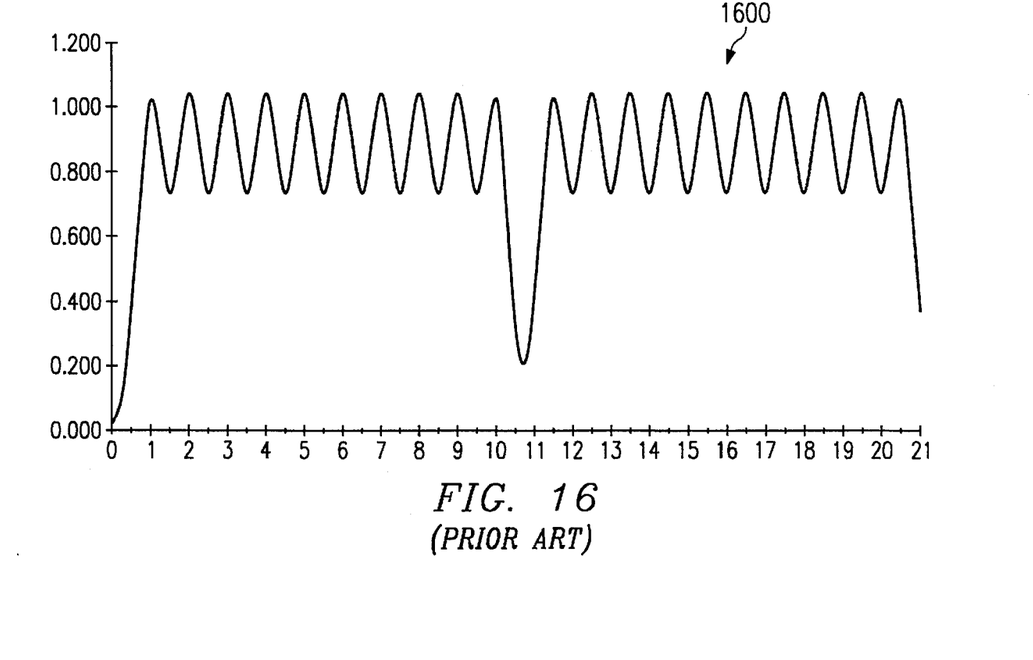
FIG. 16 is a plot of the intensity distribution of light projected onto an electrostatic printer drum across a single scan row by the two abutted ten-element modulator arrays of FIGS. 3 and 4 that are spaced apart 50% more than the ideal spacing.

FIGS. 12 through 16 show the intensity distribution for abutted arrays 302, 304 that are misaligned in only the scan direction. FIG. 12 shows the intensity distribution 1200 when the arrays are 10% further apart than the ideal spacing. FIG. 13 shows the intensity distribution 1300 when the arrays are 25% closer together than the ideal spacing. FIG. 14 shows the intensity distribution 1400 when the arrays are 25% further apart than the ideal spacing. FIG. 15 shows the intensity distribution 1500 when the arrays are 50% closer together than the ideal spacing. FIG. 16 shows the intensity distribution 1600 when the arrays are 50% further apart than the ideal spacing.

Because even a very slight misalignment may be detected by the viewer, it is desirable to ameliorate the effects of misalignment without the effort and expense necessary to precisely align the modulators 302, 304. One solution according to the present invention is to overlap a portion of the output of two modulator arrays 302, 304 and to use both of the modulator arrays 302, 304 to generate the portion of the display corresponding to the overlap. This solution requires increasing the number of modulator elements 314 used to generate the image to avoid reducing the width of the display. Pixels in the overlapped region are formed by either the first modulator array 302 or the second modulator array 304. The breakpoint, or the point at which the row of pixels transitions from being formed by the first modulator array 302 to being formed by the second modulator array 304 may be located anywhere in the overlapped region and typically changes each row of pixels.

Figure 17:
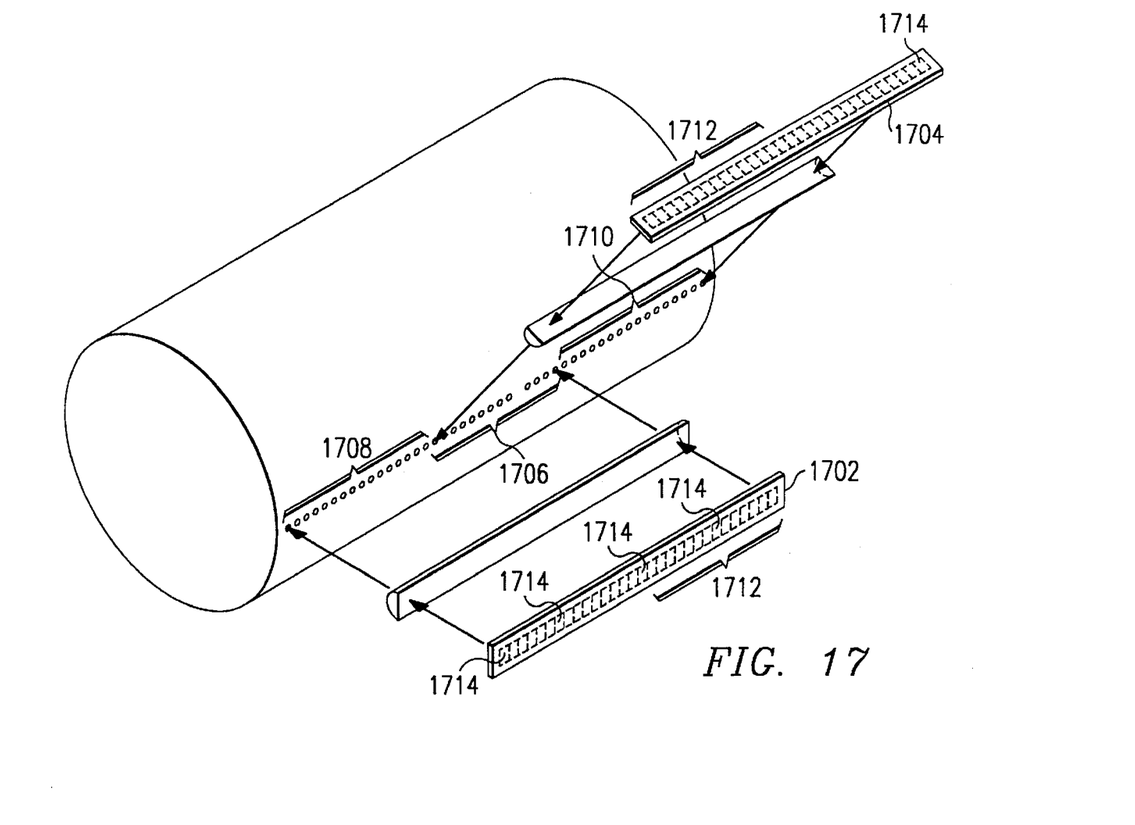
FIG. 17 is a pictorial view of two overlapping thirty-element modulator arrays used to image a twenty-pixel scan line according to the principles of the present invention.

One example of a system implementing this invention is shown in FIG. 17. In FIG. 17, the output of two modulator arrays 1702, 1704 overlaps over a 14 pixel region 1706. Pixels to the left of the overlapped region 1708 are formed only by the left-most modulator array 1702, pixels in the overlapped region 1706 may be formed by either device, and pixels to the fight of the overlapped region 1710 are formed by only the fight-most modulator array 1704. Although the two modulator arrays 1702, 1704 shown in FIG. 17 are only 30 elements long, typical electrostatic printers systems may use modulator arrays which are several hundred elements long while maintaining the 14-element overlap shown in FIG. 17. Because the overlapped region 1706 in the example shown includes such a large portion of the entire modulator array, the modulator arrays do not appear to be significantly shortened. However, the same 14-element overlap may be used with arrays that are much longer resulting in a far greater decrease in the physical width of the modulators.

Figure 18:
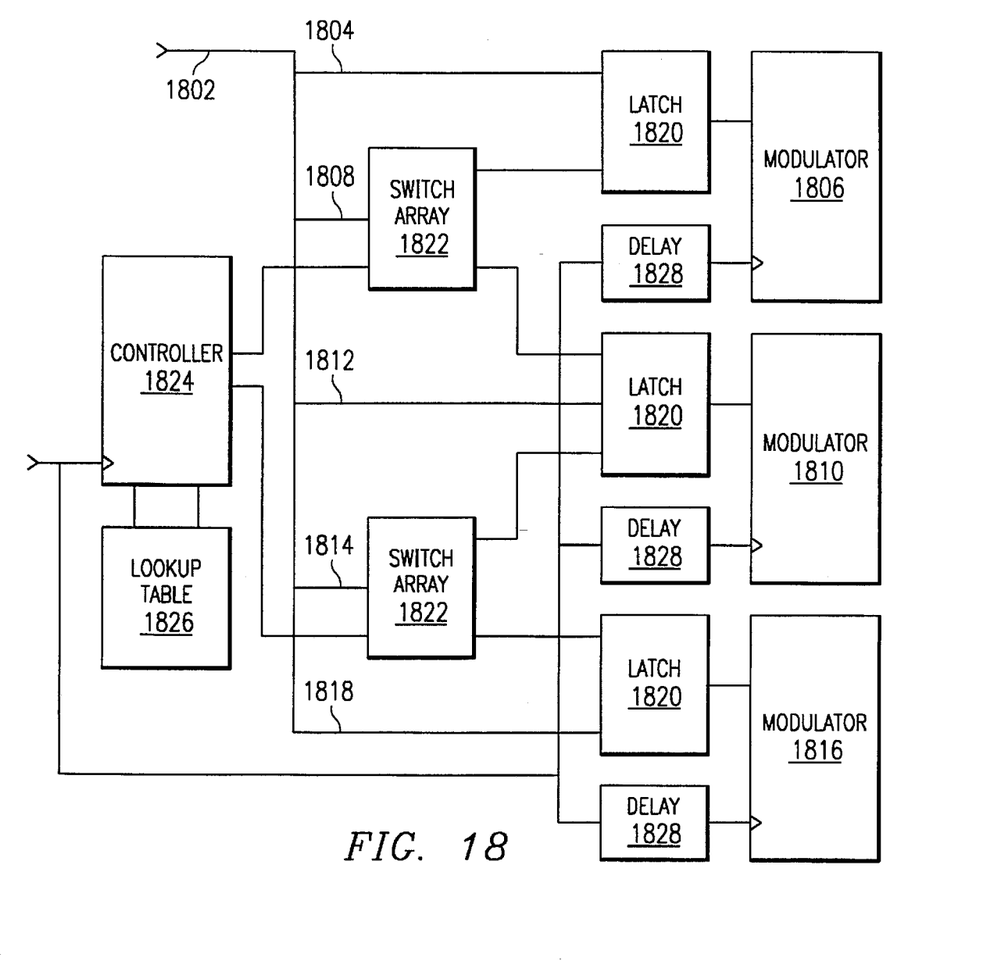
FIG. 18 is a block diagram of a control circuit used to control three overlapping modulator arrays according to the present invention.

FIG. 18 shows a block diagram of a circuit used to drive the modulator arrays. In FIG. 18, pixel data for one row of pixels is input on input bus 1802. Input bus 1802 is split into five sub-busses which each carry data for a portion of the row of pixels. Sub-bus 1804 carries data for the pixels that are only formed by the first modulator 1806. Sub-bus 1808 carries data for the pixels that may be formed by either the first modulator 1806 or the second modulator 1810. Sub-bus 1812 carries data for the pixels that are only formed by the second modulator 1810. Sub-bus 1814 carries data for the pixels that may be formed by either the second modulator 1810 or the third modulator 1816. Sub-bus 1818 carries data for the pixels that are only formed by the third modulator 1818. Sub-busses 1804, 1812, and 1818 are each driven directly to a latch 1820 corresponding with one of the modulators 1806, 1810, 1816. Sub-busses 1808 and 1814, which carry data for two separate modulators, are divided by switch arrays 1822. Each switch array 1822 drives the input data to one of the latches 1820 based on a signal from controller 1824 which determines where the breakpoint is located.

The location of the breakpoint for a number of lines may be stored in a memory lookup table 1826. Controller 1824 reads a breakpoint location from the lookup table 1826 for each line of image data. After all locations have been read, the controller 1824 starts over with the first breakpoint location stored in the table 1826, resulting in a periodic pseudo-random breakpoint pattern.

For example, if the row of pixels is 2400 pixels wide, each of the three modulators, 1806, 1810, and 1816, are 900 pixels wide, then each of the overlapped portions is 150 pixels wide. The first modulator 1806 always forms pixels 1 through 750, the second modulator 1810 always forms pixels 901 through 1500, and the third modulator 1816 always forms pixels 1651 through 2400. One switch array 1822 divides the data for pixels 751 through 900 between the first modulator 1806 and the second modulator 1810, and the other switch array 1822 divides the data for pixels 1501 through 1650 between the second modulator 1810 and the third modulator 1816. The operation of the switch arrays 1822 is controlled by controller 1824 which, according to one embodiment, outputs a number between 0 and 150. This number represents the location of the breakpoint in the switch array 1822. All of the pixels on one side of the breakpoint are formed by one modulator while all of the pixels on the other side are formed by another modulator. In the example shown in FIG. 18, the three modulators 1806, 1810, and 1816 each form one continuous segment of the row of pixels. The breakpoints represent where the three segments abut and determine the length of each of the segments.

Also shown in FIG. 18 are three delay blocks 1826. Each delay block 1826 delays the clock signals to one of the three modulators 1806, 1810, and 1816. The length of each delay allows the three modulators to image a separate portion of the printer drum (as shown in FIG. 4). Furthermore, the three delay blocks 1826 may each be adjusted to compensate for any misalignment in the process direction by delaying the operation of the modulator array until the proper portion of the printer drum has rotated precisely beneath the modulator array. Thus, the overlapping modulator elements are used to compensate for misalignment in the scan direction while the delay blocks 1826 compensate for misalignment in the process direction.

Figure 19:
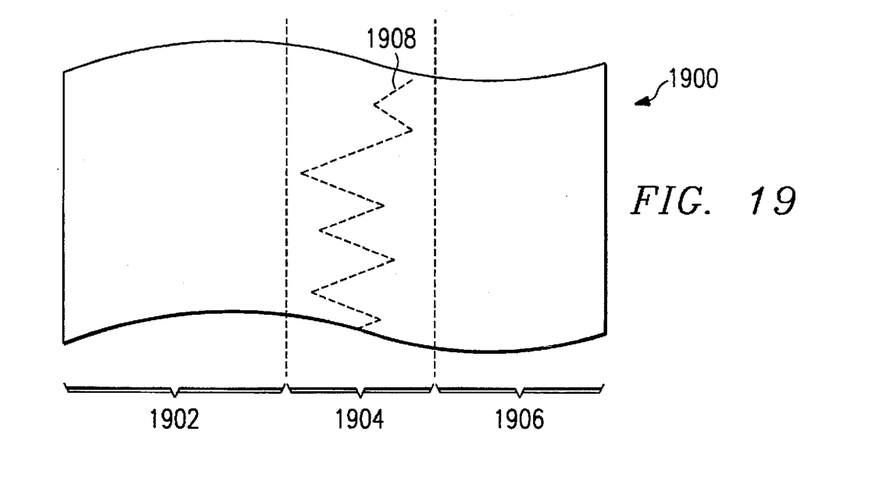
FIG. 19 is a schematic representation of the three regions of pixels formed by the modulator arrays of FIG. 17.

As shown in FIG. 19, the system described results in an array of pixels 1900 that includes three regions of pixels. The first region 1902 comprises the pixels formed only by the first modulator array, the second region 1904 comprises pixels formed by both the first and second modulator army, and the third region 1906 comprises pixels formed by only the second modulator array. As represented by the broken line 1908, the location of the breakpoint changes from row to row. Because the location of the breakpoint is not constant, the artifact formed in one row by the misalignment is moved in the following row and therefore is not reinforced by a similar artifact in the rows immediately above and below. This makes the artifact much less noticeable.

Figure 20:
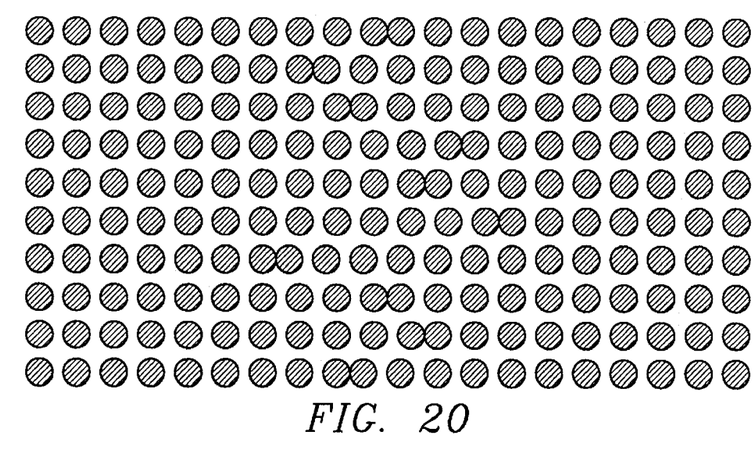
FIG. 20 is a view of an array of pixels produced by misaligned modulator arrays according to one embodiment of the present invention.
Figure 21:
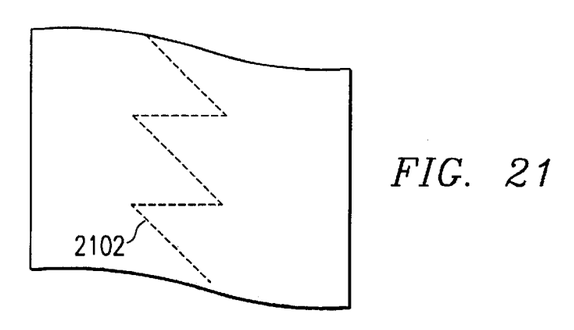
FIG. 21 is a schematic representation of the three regions of pixels formed by the modulator arrays of FIG. 17 showing the movement of the breakpoint location each row.
Figure 22:
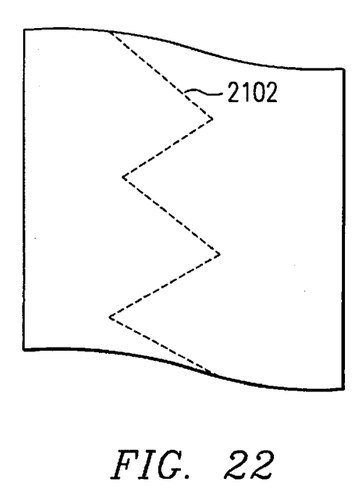
FIG. 22 is a schematic representation of the three regions of pixels formed by the modulator arrays of FIG. 17 showing the movement of the breakpoint location each row.
Figure 23:
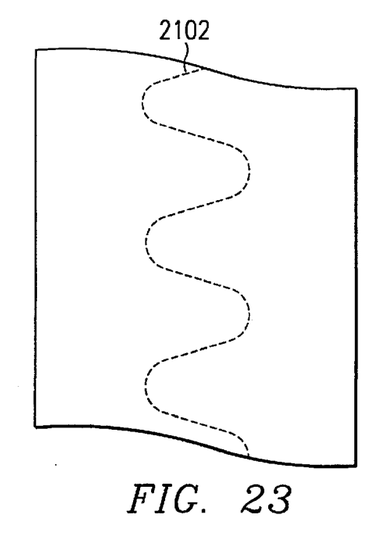
FIG. 23 is a schematic representation of the three regions of pixels formed by the modulator arrays of FIG. 17 showing the movement of the breakpoint location each row.

FIG. 20 shows the array of pixels from FIG. 6 that would be formed according to one embodiment of the present invention. As in FIG. 6, the spacing between the two modulators used to form the array of pixels is only 80% of the desired spacing. However, in FIG. 20, the middle 6 pixels of each row may be formed by either modulator array depending on the location of a randomly chosen breakpoint. As can be seen by comparing FIG. 20 to FIG. 6, the artifact caused by the misalignment is broken up from row to row of FIG. 20 and is not as noticeable. While the breakpoint location in FIG. 20 is chosen randomly, other algorithms may be used to determine where the breakpoint is located on each row. As shown by the broken line 2102 in FIGS. 21 through 23, the location of the breakpoint may trace a saw-tooth, triangle, or sine pattern from row to row of the overlapped region.

Figure 24:
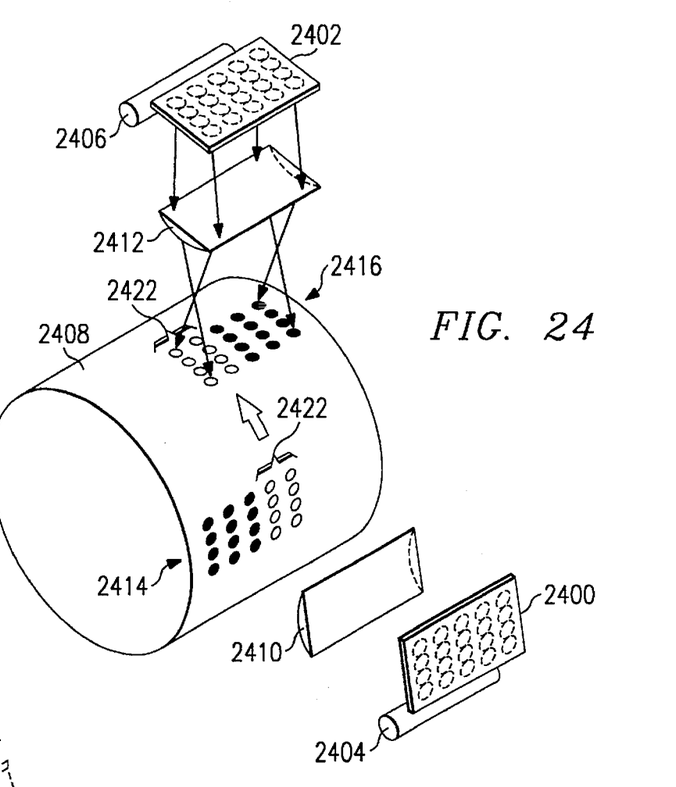
FIG. 24 is a pictorial view of two overlapping four-row modulator arrays each used to image different portions of independent scan lines according to one embodiment of the present invention.

Some printer systems use multiple rows of modulator elements to form a single row of pixels. One simplified example of such a system is shown in FIG. 24. In FIG. 24, two digital micromirror arrays 2400, 2402, as taught in U.S. Pat. No. 5,061,049, "Spatial Light Modulator and Method," issued Oct. 29, 1991, are illuminated by light sources 2404, 2406. Light reflected by the modulator arrays 2400, 2402 is focused on the printer drum 2408 by lenses 2410, 2412 to form two arrays of pixels 2414, 2416 which overlap over region 2422. When a modulator array that includes multiple rows of elements is used by the disclosed invention, each pixel may either be formed entirely by a single modulator array, or new breakpoint may be chosen for each row of the modulator array.

Typically the modulator arrays will be designed to clock the image data from one row of the modulator array to the next without the need to rewrite the image data into the modulator each row. In this case, using the same breakpoint for a row of pixels as it is passed from one row of the modulator array to the next is more efficient. If the data must be rewritten for each row of the modulator army, changing the breakpoint each time a given row of pixels is formed by another row of modulator elements will further reduce the visual artifacts.

Figure 25:
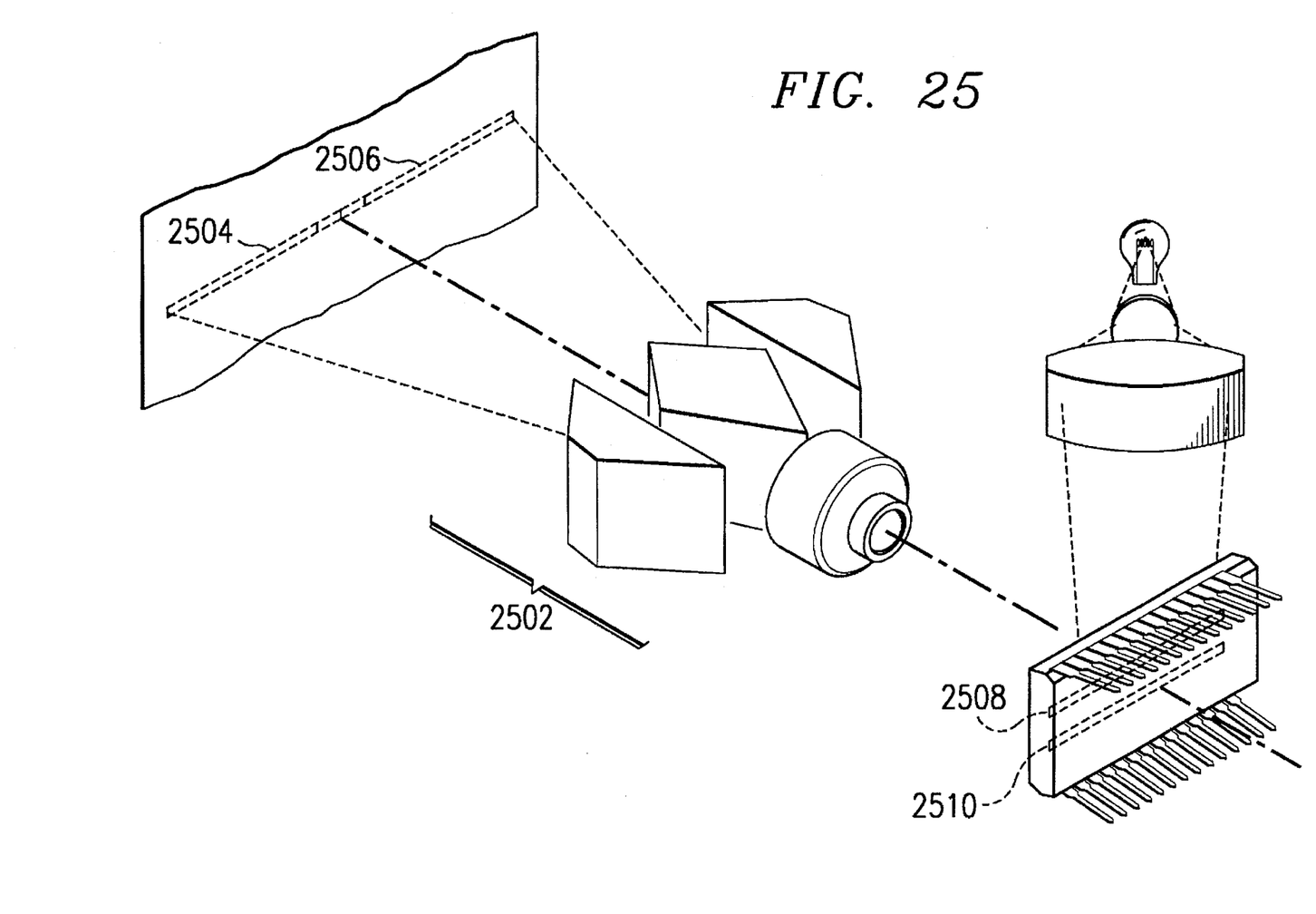
FIG. 25 is a pictorial view of a prism system that optically combines images of separate rows of modulator elements into a single image.
Figure 26:
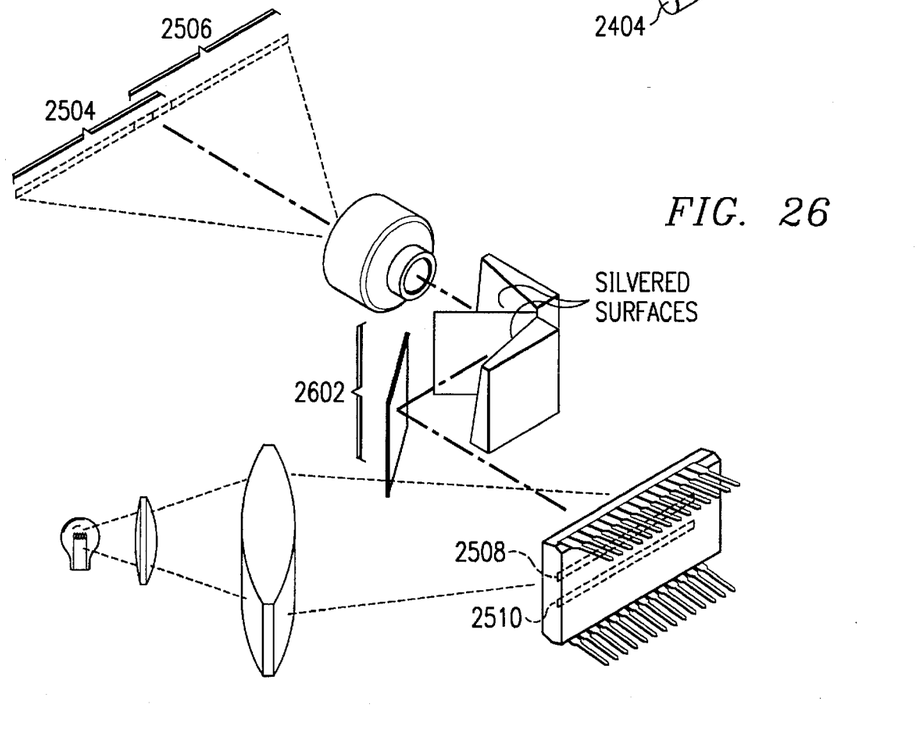
FIG. 26 is a pictorial view of a mirror system that optically combines images of separate rows of modulator elements into a single image.

The disclosed invention may also be applied to systems that optically abut rows from a single modulator array. One example of such an optical system is taught by U.S. Pat. No. 5,105,299, "Unfolded Optics for Multiple Row Deformable Mirror Device," issued Apr. 14, 1992. As shown in FIG. 25, a prism system 2502 may be used to optically shift the images 2504, 2506 from two parallel rows of modulator elements 2508, 2510 so that the images 2504, 2506 are co-linear and overlap. A mirror system 2602, as shown in FIG. 26, may also be used to accomplish the same result.

Figure 27:
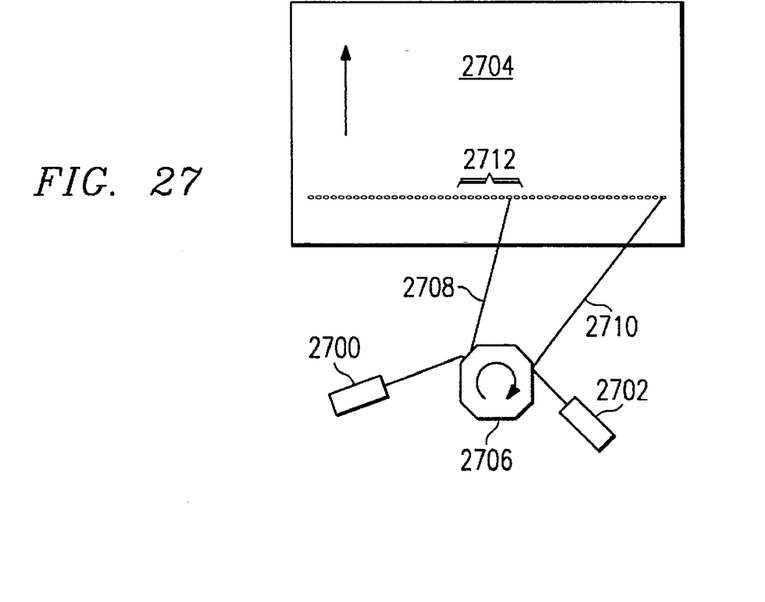
FIG. 27 is a plan view of two laser sources imaging portions of a scan row by reflection off of a single rotating scan mirror according to one embodiment of the present invention.

The modulators being aligned need not be arrays of individual elements. For example, typical laser printers use a single laser source and a spinning mirror to scan across a row. An embodiment of the present invention, shown in FIG. 27, could be used to allow the use of multiple laser sources 2700, 2702, or a single source and multiple light modulators, to simultaneously scan multiple laser beams 2708, 2710 across the photosensitive drum 2704. In the embodiment shown in FIG. 27, the two laser sources 2700, 2702 are reflecting of a shared spinning mirror 2706. As was taught in the previous embodiments of this invention, the intensity from each laser beam would be reduced when the beam is impinging an area 2712 of the drum 2704 that is imaged by multiple laser beams 2708, 2710 so that the resultant image has the desired uniform intensity across all portions of the image.

Figure 28:
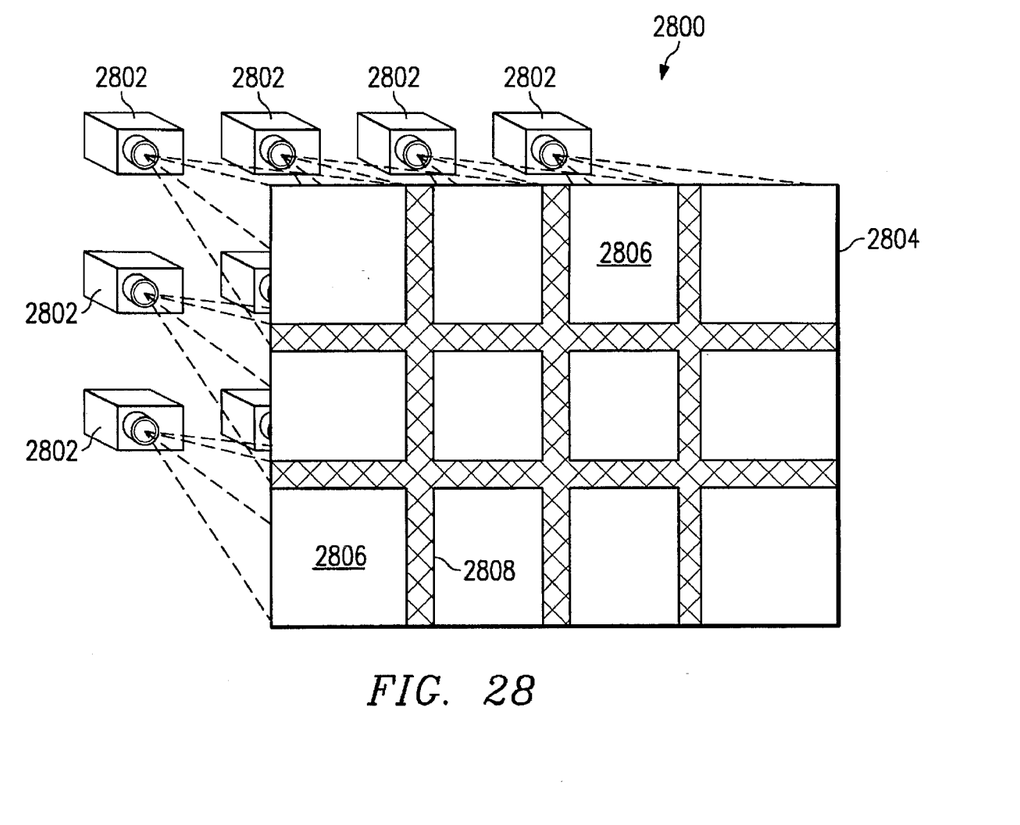
FIG. 28 is a pictorial view of a large screen image display using multiple image projection systems according to one embodiment of the present invention.

Although the embodiments of the invention discussed thus far have focused on printer systems, other embodiments are applicable to display systems. For example, if a very large screen projection display is desired, several smaller projection systems can be used in tandem to generate the display. One example of a video display system according to one embodiment of the present invention is shown in FIG. 28. In FIG. 28, a large screen display system 2800 is comprised of an array of projection systems 2802 that project an image onto the rear of a display screen 2804. The display projected onto the screen 2804 consists of areas 2806 which are imaged by only one system, and an area 2808 shown in cross-hatch which is imaged by two or more of the projection systems 2802. Each individual projection system 2802 merely reduces the intensity of the display projected onto the shared areas 2808 so that sum of all the projection systems 2802 serves to evenly illuminate the entire display.

Thus, although there has been disclosed to this point a particular embodiment for a method of ameliorating the effects of misalignment in display arrays, and display systems incorporating the method, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A system for forming a two-dimensional array of pixels comprised of at least two rows of pixels, said system comprising:
  at least two modulators for forming a row of pixels, the row of pixels comprised of at least three abutting segments;
  a first of the three segments formed by a first modulator;
  a second of the three segments formed by a second modulator;
  a third of the three segments formed by both the first modulator and the second modulator, the third segment located between the first and second segments; and
  wherein the third segment is divided into two end portions separated by a breakpoint between the two end portions, one end portion of the third segment being formed by the first modulator and the other end portion the third segment being formed by the second modulator, wherein the breakpoint may change position each line of pixels; and
  a modulator controller for inputting data m the modulators and for controlling the location of the breakpoint.

2. The system of claim 1, wherein the breakpoint is chosen randomly.

3. The system of claim 1, wherein the breakpoint is moved one position each row.

4. The system of claim 1, wherein the breakpoint is chosen such that it traces a sine function across the third segment.

5. The system of claim 1, further comprising a lookup table, the lookup table storing the breakpoint locations for one period of a periodic breakpoint pattern.

6. The system of claim 1, wherein the modulators are digital micromirror device arrays.

7. The system of claim 1, wherein the modulators are light emitting diode arrays.

8. The system of claim 1, wherein the modulators are ink jet devices.

9. The system of claim 1, wherein each modulator is comprised of a two-dimensional array of modulator elements, each column of modulator elements cooperatively forming one pixel.

10. A system for forming a two-dimensional array of pixels comprised of at least two rows of pixels, said system comprising:

at least one modulator array having multiple rows of modulator elements, the modulator array for forming a row of pixels, the row of pixels comprised of at least three abutting segments;
a first of the three segments formed by a first row of modulator elements;
a second of the three segments formed by a second row of modulator elements;
a third of the three segments formed by both the first row of modulator elements and the second row of modulator elements, the third segment located between the first and second segments; and
wherein the third segment is divided into two end portions separated by a breakpoint between the two end portions, one end portion of the third segment being formed by the first modulator and the other end portion the third segment being formed by the second modulator, wherein the breakpoint may change position each line of pixels;
a means for optically abutting the rows of modulator elements to form one row of pixels; and
a modulator controller for inputting data to the modulators and for controlling the location of the breakpoint.

11. The system of claim 10 wherein said means for optically abutting is a prism system.

12. The system of claim 10 wherein said means for optically abutting is a mirror system.

13. The system of claim 10 wherein said modulator array is a digital micromirror device.

14. A system for forming a two-dimensional array of pixels comprised of at least two rows of pixels, said system comprising:

at least two modulators for forming a row of pixels, the row of pixels comprised of at least three abutting segments;
a first of the three segments formed by a first modulator;
a second of the three segments formed by a second modulator;
a third of the three segments formed by both the first modulator and the second modulator, the third segment located between the first and second segments; and
wherein the third segment is divided into two end portions separated by a breakpoint between the two end portions, one end portion of the third segment being formed by the first modulator and the other end portion of the third segment being formed by the second modulator, wherein the breakpoint may change position each line of pixels;
a lookup table for storing a series of breakpoint locations;
a modulator controller for inputting data to the modulators and for controlling the breakpoint location, wherein the modulator controller reads the breakpoint location from the lookup table.

15. The system of claim 14 wherein the lookup table stores a random series of breakpoint locations.

16. The system of claim 14 wherein the values stored in the lookup table move the location of the breakpoint one pixel from the previous value.

17. The system of claim 14 wherein the values stored in the lookup table move the location of the breakpoint in a sine pattern across the third segment.

* * * * *